United States Patent
Walters et al.

(10) Patent No.: US 12,008,572 B2
(45) Date of Patent: Jun. 11, 2024

(54) METHODS AND SYSTEMS FOR AUTHENTICATION FOR REMOTE TRANSACTIONS

(71) Applicant: Capital One Services, LLC, McLean, VA (US)

(72) Inventors: Austin Walters, Savoy, IL (US); Fardin Abdi Taghi Abad, Seattle, WA (US); Jeremy Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/206,493

(22) Filed: Mar. 19, 2021

(65) Prior Publication Data

US 2022/0300973 A1 Sep. 22, 2022

(51) Int. Cl.
*G06Q 20/00* (2012.01)
*G06Q 20/36* (2012.01)
(Continued)

(52) U.S. Cl.
CPC ......... *G06Q 20/4015* (2020.05); *G06Q 20/36* (2013.01); *G06V 20/10* (2022.01); *G06Q 20/3224* (2013.01)

(58) Field of Classification Search
CPC ................................................ G06Q 20/4015
(Continued)

(56) References Cited

U.S. PATENT DOCUMENTS 8,924,292 B1 * 12/2014 Ellis ..................... G06Q 20/36
  705/41
2014/0101036 A1 4/2014 Phillips et al.
(Continued)

FOREIGN PATENT DOCUMENTS

WO WO 2014/093390 A1 6/2014
WO WO 2016/134016 A1 8/2016
WO WO-2021025698 A1 * 2/2021

OTHER PUBLICATIONS

User Authentication based on Personal Image Experiences IEEE Conferences2018-03-0132018 IEEE International Conference on Pervasive Computing and Communications Workshops (PerCom Workshops) (pp. 336-341) Authors: Ngu Nguyen • Stephan Sigg (Year: 2018).*

(Continued)

*Primary Examiner* — Bruce I Ebersman
*Assistant Examiner* — John A Anderson
(74) *Attorney, Agent, or Firm* — Bookoff McAndrews, PLLC (57) ABSTRACT

Disclosed are methods, systems, and non-transitory computer-readable medium for authentication of remote transactions. For instance, the method may include receiving a request for an interaction, obtaining data relating to an authentication item, and determining the location of a user device used by the user to initiate the interaction. The method may further include transmitting, to the user device, authentication data configured to cause a camera device to generate a response including the location of the camera device, receiving the response, authenticating the camera device as being associated with the user, and receiving one or more images of the authentication item captured by the camera device. The method may additionally include verifying that the user is in possession of the authentication item (Continued)

based on an analysis of the one or more images being received from the camera device and approving the interaction.

17 Claims, 4 Drawing Sheets

(51) Int. Cl.
    *G06Q 20/40*     (2012.01)
    *G06V 20/10*     (2022.01)
    *G06Q 20/32*     (2012.01)

(58) Field of Classification Search
    USPC .......................................................... 705/44
    See application file for complete search history.

(56) References Cited

U.S. PATENT DOCUMENTS

| | | |
|---|---|---|
| 2014/0172531 A1 | 6/2014 | Liberty et al. |
| 2018/0349939 A1* | 12/2018 | Setchell ................. G06V 20/52 |
| 2020/0042685 A1* | 2/2020 | Tussy ...................... G06F 21/32 |
| 2020/0366670 A1* | 11/2020 | Cordiner ............... H04W 12/64 |

OTHER PUBLICATIONS

Seeing-is-believing: using camera phones for human-verifiable authentication IEEE Conferences2005-01-0132005 IEEE Symposium on Security and Privacy (S&P'05) (pp. 110-124) Authors: J.M. McCune • A. Perrig • M.K. Reiter (Year: 2005).*

* cited by examiner

METHODS AND SYSTEMS FOR AUTHENTICATION FOR REMOTE TRANSACTIONS

TECHNICAL FIELD

Various embodiments of the present disclosure relate generally to methods and systems for authenticating interactions and, more particularly, to methods and systems for authenticating remote transactions using a user device and an authentication item.

BACKGROUND

When interacting remotely, such as during an online transaction with a merchant, people may attempt to make fraudulent representations, including committing fraud by using a credit card number that does not belong to them. Fraudulent transactions can financially harm account holders, merchants, and card issuers. In order to increase security, transactions have begun to require additional information to authenticate or secure an interaction. For example in a merchant transaction, beyond the card number, a merchant may require additional information such as a card verification number and/or billing zip code. While requiring additional information may be helpful in securing an interaction, having to enter a few more numbers, for example, to fraudulently use another person's card may not fully address the parties' security concerns.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, methods and systems are disclosed for authentication for remote transactions. The methods and systems may provide authentication by requiring a user to prove that they are in possession of an authentication item.

For instance, a method may include receiving first data of an interaction associated with a user, obtaining second data of an authentication item associated with the user, and determining a first geographic location of a user device used by the user to initiate the interaction, based on the first data. The method may further include transmitting, to the user device, authentication data configured to cause a camera device to generate a response including information indicative of a second geographic location of the camera device, receiving the response to the authentication data from the camera device, and authenticating the camera device as being associated with the user, based at least on a comparison of the first geographic location and the second geographic location. The method may also include receiving one or more images of the authentication item captured by the camera device, verifying that the user is in possession of the authentication item based on an analysis of the one or more images being received from the camera device, and in response to verifying that the user is in possession of the authentication item, approving the interaction.

A system may include a memory configured to store instructions and a processor operatively connected to the memory and configured to execute the instructions to perform operations. The operations may include receiving first data of an interaction associated with a user, obtaining second data of an item associated with the user, determining a first geographic location of a user device used by the user to initiate the interaction based on the first data, transmitting authentication data to the user device, the authentication data configured to cause a camera device to generate a response indicative of a second geographic location of the camera device, and receiving the response to the authentication data from the camera device. The operations may further include authenticating the camera device as being associated with the user, based at least on a comparison of the first geographic location and the second geographic location, receiving an image of the item captured by the camera device, verifying that the user is in possession of the item based on an analysis of the image being received from the camera device, and approving the interaction.

A non-transitory computer-readable medium may store instructions that, when executed by a processor, cause the processor to perform a method. The method may include receiving first data of an interaction associated with a user, obtaining second data of an authentication item associated with the user, determining a first geographic location of a user device used by the user to initiate the interaction based on the first data, transmitting, to the user device, authentication data configured to cause a camera device to generate a response, wherein the response includes information indicative of a second geographic location of the camera device, and receiving the response to the authentication data from the camera device. The method further including authenticating the camera device as being associated with the user, based at least on a comparison of the first geographic location and the second geographic location, receiving one or more images of the authentication item captured by the camera device, verifying that the user is in possession of the authentication item based on an analysis of the one or more images received from the camera device, and in response to verifying that the user is in possession of the authentication item, approving the interaction and transmitting approval data.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to methods and systems for providing authentication for a remote transaction using an authentication item.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure is directed to methods and systems for providing authentication for a remote transaction using an authentication item. In particular, a method according to the present disclosure may begin with the receipt of a request for approval of an interaction from a user. This request for approval may be transmitted as a result of a user attempting to initiate and/or complete an interaction, such as logging into an account or completing a transaction. The method may proceed to direct a user to use a camera device to scan authentication data in order to authenticate the camera, and then, once the camera device has been authenticated, guide the user in scanning an item relevant to the request. The user may, for example and not limitation, on a log in or checkout screen, be provided with instructions to use a camera device to scan authentication data. Upon authentication of the camera device, the user may be provided with additional instructions to scan the relevant item. Based on the authentication of the camera device and the scan of the item, a method in accordance with the present disclosure may then approve the requested interaction. Not allowing the requested interaction to proceed unless the user provides information sufficient to verify that the request origin, the location of the camera device, and the relevant item are all co-located may aid in securing the interaction and preventing unauthorized access.

Figure 1:
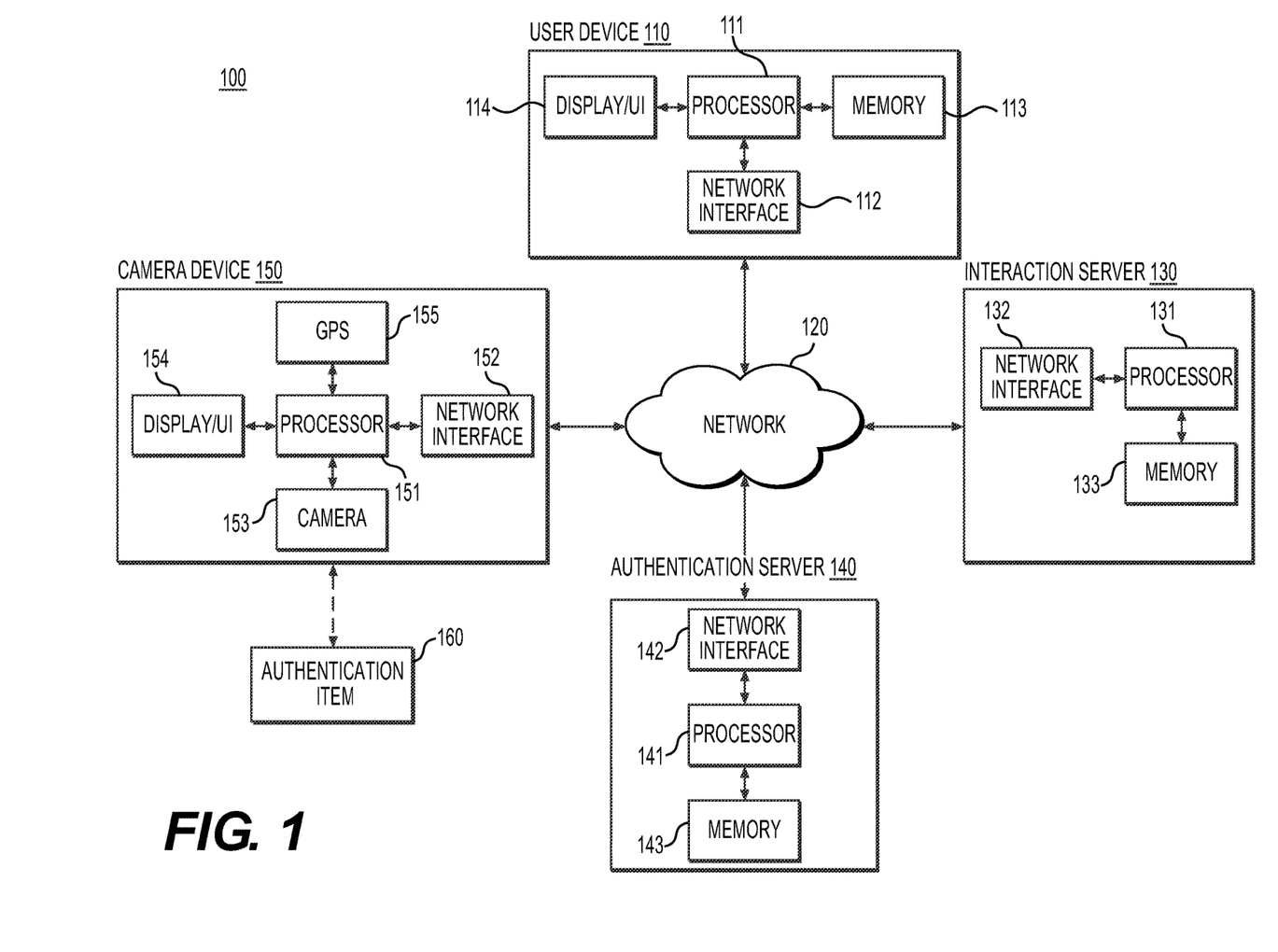
FIG. 1 depicts an exemplary block diagram of a system environment for authenticating an interaction, according to one or more embodiments.

FIG. 1 depicts an exemplary block diagram of a system environment 100 according to one or more embodiments of the present disclosure. The system environment 100 may include user device 110 on which a user may initiate a remote interaction. User device 110 can be, for example, a computer, smartphone, tablet, or other device that can allow a person to access the internet or another network to interact with another entity, for example, an online merchant. In some embodiments, user device 110 may be a point of sale (POS) terminal or kiosk associated with a merchant or other entity that can allow a person to access the internet or another network to initiate an interaction. User device 110 can include processor 111 to execute instructions that may be stored in memory 113, receive and process user inputs provided via display/user interface (UI) 114, and transmit data via network interface 112. Network interface 112 may be a wired or wireless transmitter and receiver, and can also be implemented according to the present disclosure as a combination of wired and wireless connections.

Network interface 112 of user device 110 may communicate with other elements of the system environment via network 120. Network 120 may be implemented as, for example, the Internet, a wireless network, a wired network (e.g., Ethernet), a local area network (LAN), a Wide Area Network (WANs), Bluetooth, Near Field Communication (NFC), or any other type of network or combination of networks that provides communications between one or more components of the system environment 100. In some embodiments, the network 120 may be implemented using a suitable communication protocol or combination of protocols such as a wired or wireless Internet connection in combination with a cellular data network.

Interaction server 130 may be associated with, for example, a website, merchant, and/or other entity with which the user wishes to securely interact. Interaction server may include a processor 131, network interface 132, and memory 133. Processor 131 may receive communications from user device 110 via network 120 and network interface 132, and respond to user device by, for example, processing communications from user device 110 and executing instructions stored in memory 133.

Authentication server 140 may be associated with, for example, a security provider and/or an institution that manages personal, financial, or other secure resources. Authentication server 140 may include processor 141, network interface 142, and memory 143. Processor 141 may receive requests for authentication from user device 110 and/or interaction server 130 via network 120 and network interface 142. In some embodiments, authentication server 140 may include or be operably in communication with one or more databases associated with a security provider and/or an institution to provide secure access to information regarding a user account and/or personal or financial resources.

In accordance with the present disclosure, camera device 150 may be a portable device capable of traveling with a user, such as, for example, a smartphone, tablet, or camera. Camera device 150 may include processor 151, network interface 152, camera 153, display/UI 154, and GPS module 155. Camera device may use camera 153 to scan authentication data and/or capture an image of authentication item 160, and processor 151 may relay the scan and/or image to authentication server 140 via network interface 152 and network 120. Authentication item 160 may be an item or token that can be securely associated with a user, and may take the form of a credit card, driver's license or other identification, security badge, and/or an object chosen by the user or provided by an institution. The scan and/or image relayed to authentication server 140 may include information regarding the current user of and location of camera device 150, such as, for example, the identity of the user that is logged into camera device 150 or GPS information regarding the location of camera device 150. In some embodiments in accordance with the present disclosure, camera device 150 may be associated and in connection with user device 110. In such applications, camera device 150 may share certain components with user device 110 such as a processor, network interface, and/or memory.

Figure 2:
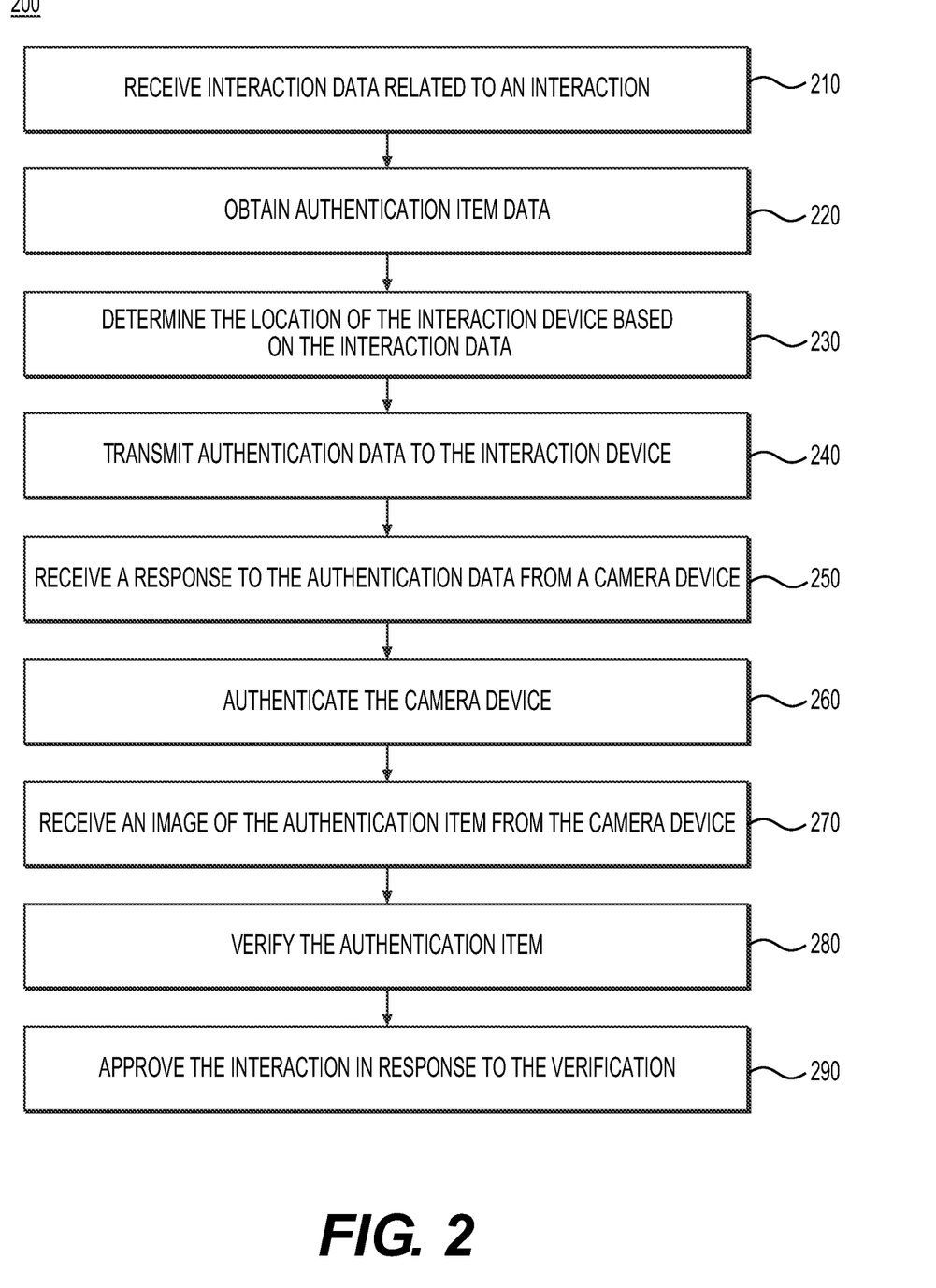
FIG. 2 depicts a flowchart of an exemplary method of providing authentication for a remote transaction, according to one or more embodiments.

FIG. 2 depicts a flowchart illustrating a method 200 for providing authentication for a remote transaction, according to one or more embodiments of the present disclosure. The method may be performed by a system in accordance with the present disclosure, including one or more of the devices that comprise the system environment 100. For example, in some embodiments in accordance with the present disclosure, method 200 may be carried out by authentication server 140.

Method 200 may begin at step 210 with the receipt of interaction data related to an interaction. This interaction data may be transmitted by one or both of user device 110 and interaction server 130 in response to a user seeking to provide information such as, for example, account information to interaction server 130. The interaction data may include information such as the nature of the desired interaction and the information required by interaction server 130 to initiate and/or complete the desired interaction. By way of example and not limitation, an interaction may be a login attempt or a commercial transaction that a user wishes to complete with a particular payment account.

Having received the relevant interaction data, at step 220, the system may obtain a second packet of data related to an authentication item 160 associated with the user. Authentication item data may be retrieved by the system from, for example, one or more databases associated with a security provider and/or an institution, and may include information sufficient to identify authentication item 160, such as a data matrix code, item identifying features, or item identifying data. In accordance with the present disclosure, an example of the authentication item data may be an image or images of an authentication object or other unique identifiable characteristics of an authentication item 160. For example, and not limitation, these images may be of a unique token assigned to or chosen by a user to secure their account, or may be characteristics of an item such as the numbers on a driver's license, credit card, or the like belonging to the user.

At step 230, a system in accordance with the present disclosure may determine the geographic location of the user device 110 used by the user to initiate the interaction. For example, this location may be determined by identifying and analyzing an internet protocol ("IP") address corresponding to and associated with user device 110 and provided in the first packet of interaction data. In some embodiments in accordance with the present disclosure, user device 110 may be a smartphone or tablet, and the location of the device may be determined by obtaining location data from a mobile application stored in memory 113 of user device 110.

Figure 3:
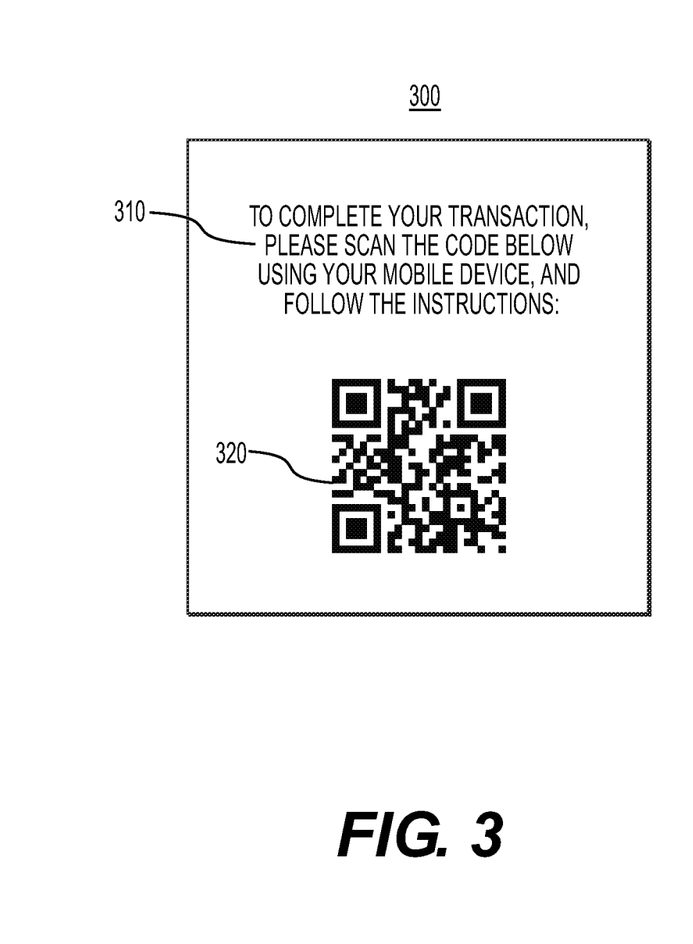
FIG. 3 depicts an exemplary user interface that may provide prompts to a user on a user device, according to one or more embodiments.

Once located, at step 240, the system may transmit authentication data to user device 110. The authentication data may then be displayed on display 114 of user device 110, and may be configured to cause camera device 150 to generate and provide a response indicative of the geographic location of camera device 150 to the system. For example, in some embodiments in accordance with the present disclosure, the authentication data may be a quick response (QR) code, and a user may position camera device 150 so as to be able to capture an image of the QR code displayed on display 114. Upon imaging or scanning the QR code, camera device 150 may be directed to a website and/or mobile application which may provide for the transmission of a response including the location of camera device 150 to authentication server 140. An exemplary graphical user interface ("GUI") that a user might see on display 114 of user device 110 is illustrated and discussed below with respect to FIG. 3.

At step 250, the system may receive the response indicative of the location of camera device 150. In some embodiments in accordance with the present disclosure, the received response is transmitted and received via an encrypted network. Having received and determined the locations of both user device 110 and camera device 150, at step 260, the system may authenticate camera device 150 as being associated with the user, based at least in part on a comparison of the two locations.

For example, the system may determine whether user device 110 is within a predetermined proximity of camera device 150. This predetermined geographical proximity may be a distance determined by, for example, referring to one or more fraud criteria, such as a distance indicative that user device 110 and camera device 150 are at, for example, the same address. In some embodiments in accordance with the present disclosure, the predetermined geographical proximity may be based on one or more known geographic boundaries, such as the known boundaries of a building or buildings previously identified by the user, such as, for example, a user's home, school, or work.

The step of authenticating camera device 150 as being associated with the user may include parsing the response from camera device 150 and extracting user identifying information such as, for example, a user identifier associated with a user profile that may be stored in a database to which authentication server 140 has access. The user identifier received from camera device 150 may be generated or provided based on instructions from a digital wallet application stored on camera device 150. A digital wallet may be, for example and not limitation, an application on a user device that can store credentials and/or other information required for carrying out transactions. In some embodiments in accordance with the present disclosure, a digital wallet may store and/or generate one or more user identifiers in response to a request for identification.

The system having authenticated camera device 150, the user may be prompted to scan or image authentication item 160. This prompt may take the form of a GUI discussed in further detail below with respect to FIG. 4. The scanning and/or imaging of authentication item 160 may involve capturing one or more images of authentication item 160 as indicated by the instructions provided. Once authentication item 160 has been imaged or scanned by camera device 150, the image or scan may be transmitted by camera device 150.

At step 270, the system may receive an image or scan of authentication item 160 as captured by authenticated camera device 150. Once received, at step 280, the system may verify that the user is in possession of authentication item 160. This verification may be based on, for example, and not limitation, detecting that image or scan was received from camera device 150 and analyzing the image or scan by applying one or more computer vision object identification techniques. By comparing the received image (as analyzed by the application of computer vision object identification techniques) with the authentication item data, the system may be able to confirm both that the image is of authentication item 160 and that the image was captured at the same location as was provided in the interaction data.

Provided the system is able to determine and verify that the user is in possession of authentication item 160, at step 290, the system may approve the interaction by providing the requested data (approval data) to interaction server 130 and/or user device 110. By way of illustration, in some embodiments according to the present disclosure, the requested data may be a password or credit card number that interaction server 130 may use to initiate a user login or complete a transaction.

As noted above, FIG. 3 illustrates an exemplary GUI 300 that may be displayed on display 114 of user device 110. GUI 300 may, for example, display authentication data to a user so that the user may scan or image the authentication data with camera device 150. GUI 300 may represent an exemplary user interface that a participant may see when they attempt to log-in to an account or complete a transaction. For example, element 310 may indicate the instructions to the user, and element 320 may represent the authentication data. The authentication data may be, for example, in the form of a QR code or unique alphanumerical code capable of being scanned or imaged by camera device 150. As discussed above, when the authentication data is scanned by camera device 150, it may direct processor 151 to provide the response indicative of the geographic location of camera device 150.

Figure 4:
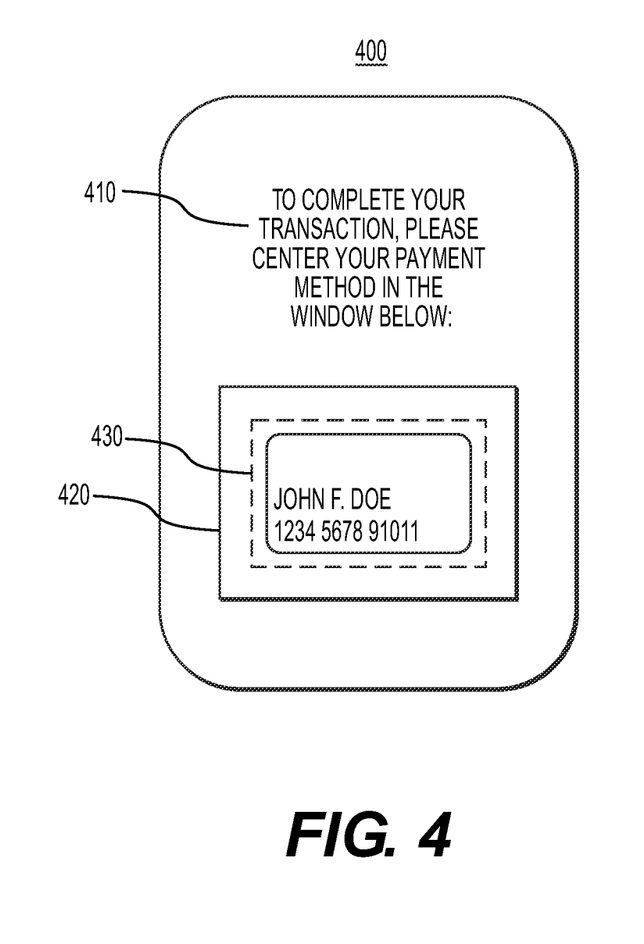
FIG. 4 depicts an exemplary user interface that may provide prompts to a user on a camera device, according to one or more embodiments.

FIG. 4 illustrates an exemplary GUI 400 that may be displayed on camera device 150 in order to prompt the scanning or imaging of authentication item 160. GUI 400 may include, for example, instructions to the user (as indicated by element 410), and element 420 may represent the view provided by camera 153. In some embodiments in accordance with the present disclosure, in order to ensure a proper image/scan, element 430 may be provided to represent a centered target within which the user is to center authentication item 160, such as, for example, a driver's license or credit card.

A system in accordance with the present disclosure, in executing the methods as discussed above, may provide additional security through authentication using an authentication item. By requiring a user to provide a scan or image of a unique item, in addition to having locations for the device(s) the user may be using checked for a match, it may be more difficult to fraudulently access another person's passwords, private information, and/or resources. This may result in reduced security costs and/or improved security for the user, the custodian(s) of the passwords/private information/resources, and/or the third party with which the user is interacting.

Figure 5:
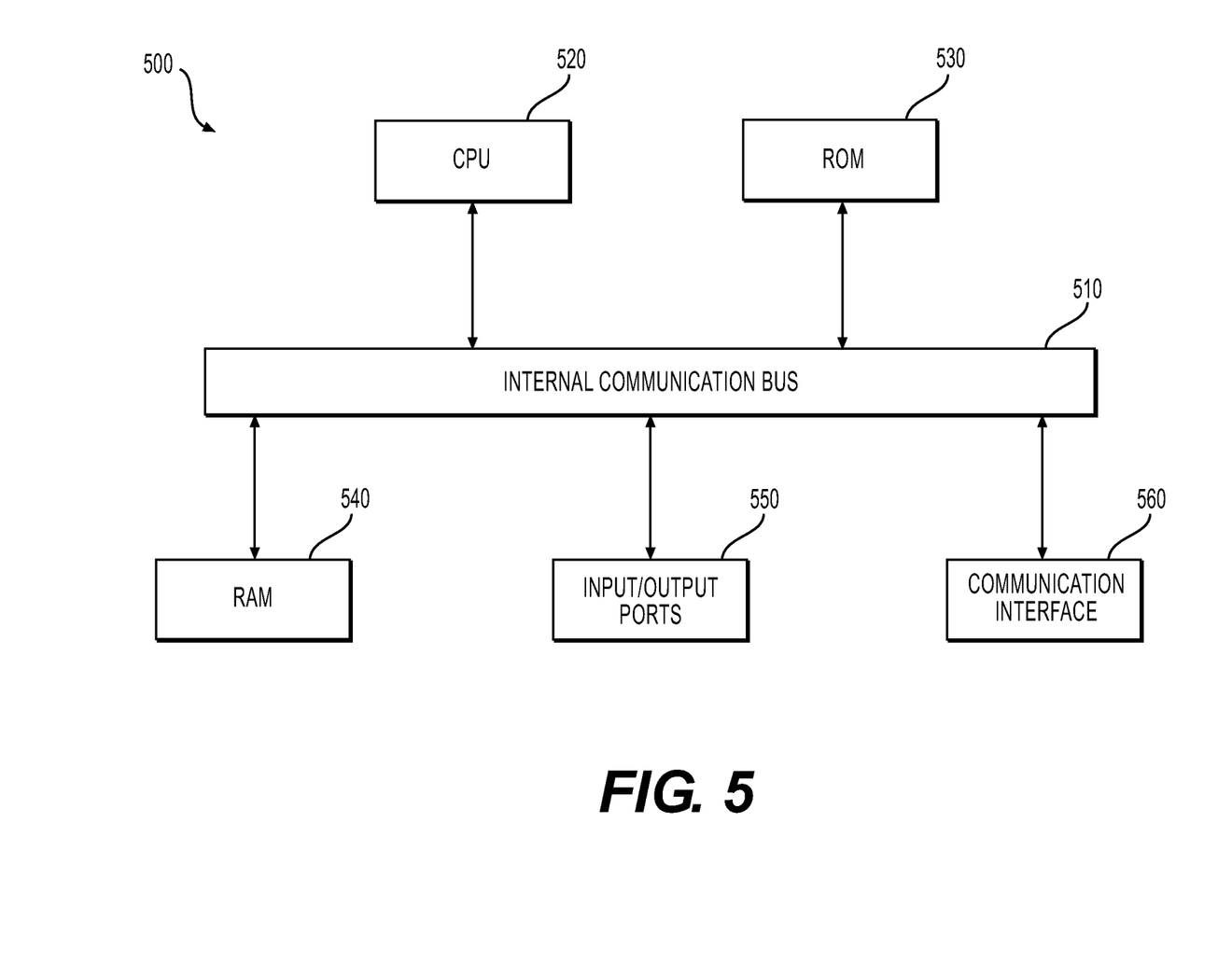
FIG. 5 depicts an exemplary system that may execute techniques presented herein.

FIG. 5 depicts an example system that may execute techniques presented herein. FIG. 5 is a simplified functional block diagram of a computer that may be configured to execute techniques described herein, according to exemplary embodiments of the present disclosure. Specifically, the computer (or "platform" as it may not be a single physical computer infrastructure) may include a data communication interface 560 for packet data communication. The platform may also include a central processing unit (CPU) 520, in the form of one or more processors, for executing program instructions. The platform may include an internal communication bus 510, and the platform may also include a program storage and/or a data storage for various data files to be processed and/or communicated by the platform such as ROM 530 and RAM 540, although the system 500 may receive programming and data via network communications. The system 500 also may include input and output ports 550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. For example, other embodiments may combine or exclude features from one or more of the embodiments presented in this disclosure, and/or may include additional features. It is intended that the specification and examples be considered as exemplary only, with a true scope and spirit of the invention being indicated by the following claims.

What is claimed is:

1. A computer-implemented method, comprising:
   receiving first data of an interaction associated with a user, the first data including an indication of a payment account of the user to be used to complete the interaction;
   obtaining, from a data store, second data of an authentication item associated with the user, wherein the authentication item is an object that includes an identifier associated with the payment account of the user indicated by the first data, and the second data of the authentication item includes the identifier;
   determining a first geographic location of a user device used by the user to initiate the interaction, based on the first data, wherein an IP address corresponding to the user device included in the first data is identified to determine the first geographic location;
   transmitting authentication data to the user device for display, wherein the authentication data displayed on the user device is read by a camera device and the reading of the authentication data causes the camera device to generate a response that includes information indicative of a second geographic location of the camera device;
   receiving the response from the camera device;
   authenticating the camera device as being associated with the user, based at least on a comparison of the first geographic location of the user device determined based on the first data and the second geographic location of the camera device included in the response received from the camera device, the comparison indicating the second geographic location is a matching geographic location that is within a predetermined geographical proximity to the first geographic location;
   in response to the authenticating of the camera device, providing a user interface to the camera device for display on the camera device, wherein the displayed user interface includes a prompt, the prompt including instructions for the user to capture one or more images of the authentication item using the camera device;
   receiving one or more images;
   verifying that the user is in possession of the authentication item based on:
      a detection that the one or more images are received from and captured by the camera device authenticated as being associated with the user, the detection confirming that the one or more images were captured at the matching geographic location to the first geographic location of the user device used by the user to initiate the interaction, and
      a comparison of the one or more images with the identifier included in the second data of the authentication item obtained from the data store indicating the one or more images are of the authentication item; and
   in response to the authenticating of the camera device and the verifying that the user is in possession of the authentication item, approving the interaction and transmitting approval data, the approval data including the identifier for use in completing the interaction using the payment account.

2. The computer-implemented method of claim 1, wherein the predetermined geographical proximity is based on one or more geographic boundaries.

3. The computer-implemented method of claim 1, wherein the received response is received through an encrypted network.

4. The computer-implemented method of claim 1, wherein authenticating the camera device as being associated with the user includes parsing the received response and extracting user identifying information corresponding to the user; and
   wherein the user identifying information includes at least a user identifier associated with a user profile stored in a database.

5. The computer-implemented method of claim 4, wherein the user identifying information is received from the camera device based on instructions from a digital wallet stored on the camera device.

6. The computer-implemented method of claim 1, wherein verifying that the user is in possession of the authentication item includes an application of one or more computer vision object identification techniques to analyze the one or more images, and the analyzed one or more images are compared with the second data in the comparison.

7. The computer-implemented method of claim 1, wherein the second data of the authentication item comprises one or more of: a data matrix code, item identifying features, or item identifying data that include the identifier.

8. The computer-implemented method of claim 1, wherein the authentication item is a card, and the identifier is a number associated with the payment account.

9. The computer-implemented method of claim 1, wherein the first data of the interaction further includes information indicating a type of the interaction, the type of the interaction being a transaction.

10. A system, comprising a memory configured to store instructions and a processor operatively connected to the memory and configured to execute the instructions to perform operations, including:
    receiving first data of an interaction associated with a user, the first data including an indication of a payment account of the user to be used to complete the interaction;

obtaining, from a data store, second data of an item associated with the user, wherein the item is an object that includes an identifier associated with the payment account of the user indicated by the first data, and the second data of the item includes the identifier;

determining a first geographic location of a user device used by the user to initiate the interaction, based on the first data, wherein an IP address corresponding to the user device included in the first data is identified to determine the first geographic location;

transmitting authentication data to the user device for display;

in response to a camera device reading the authentication data displayed on the user device, receiving, from the camera device, a response generated by the camera device based on the reading of the authentication data, the response including a second geographic location of the camera device;

authenticating the camera device as being associated with the user, based at least on a comparison of the first geographic location of the user device determined based on the first data and the second geographic location of the camera device included in the response received from the camera device, the comparison indicating the second geographic location is a matching geographic location that is within a predetermined geographical proximity to the first geographic location;

in response to the authenticating of the camera device, providing a user interface to the camera device for display on the camera device, wherein the displayed user interface includes a prompt, the prompt including instructions for the user to capture an image of the item using the camera device;

receiving an image;

verifying that the user is in possession of the item based on:
  a detection that the image is received from and captured by the camera device authenticated as being associated with the user, the detection confirming that the image was captured at the matching geographic location to the first geographic location of the user device used by the user to initiate the interaction, and
  a comparison of the image with the identifier included in the second data of the item obtained from the data store indicating the image is of the item; and in response to the authenticating of the camera device and the verifying that the user is in possession of the item, approving the interaction and transmitting approval data, the approval data including the identifier for use in completing the interaction using the payment account.

11. The system of claim 10,
wherein the predetermined geographical proximity is based on one or more geographic boundaries.

12. The system of claim 10, wherein the second data of the item comprises one or more of: a data matrix code, item identifying features, or item identifying data that include the identifier.

13. The system of claim 10, wherein authenticating the camera device as being associated with the user includes parsing the received response and extracting user identifying information corresponding to the user; and
  wherein the user identifying information includes at least a user identifier associated with a user profile stored in a database.

14. The system of claim 13, wherein the user identifying information is received from the camera device based on instructions from a digital wallet stored on the camera device.

15. The system of claim 10, wherein verifying that the user is in possession of the item includes an application of one or more computer vision object identification techniques to analyze the image, and the analyzed image is compared with the second data in the comparison.

16. The system of claim 10, wherein the item is a card, and the identifier is a number associated with the payment account.

17. A non-transitory computer-readable medium encoded with instructions, which when executed by a processor, cause the processor to perform operations comprising:
  receiving first data of an interaction associated with a user, the first data including an indication of a payment account of the user to be used to complete the interaction;
  obtaining, from a data store, second data of an authentication item associated with the user, wherein the authentication item is an object that includes an identifier associated with the payment account of the user indicated by the first data, and the second data of the authentication item includes the identifier;
  determining a first geographic location of a user device used by the user to initiate the interaction, based on the first data, wherein an IP address corresponding to the user device included in the first data is identified to determine the first geographic location;
  transmitting authentication data to the user device for display, wherein the authentication data displayed on the user device is read by a camera device and the reading of the authentication data causes the camera device to be directed to an application and to generate a response the response including information indicative of a second geographic location of the camera device;
  receiving the response from the camera device via the application;
  authenticating the camera device as being associated with the user, based at least on a comparison of the first geographic location of the user device determined based on the first data and the second geographic location of the camera device included in the response received from the camera device, the comparison indicating the second geographic location is a matching geographic location that is within a predetermined geographical proximity to the first geographic location;
  in response to the authenticating of the camera device, providing a user interface to the camera device for display on the camera device, wherein the displayed user interface includes a prompt, the prompt including instructions for the user to capture one or more images of the authentication item using the camera device;
  receiving one or more images;
  verifying that the user is in possession of the authentication item based on:
    a detection that the one or more images are received from and captured by the camera device authenticated as being associated with the user, the detection confirming that the one or more images were captured at the matching geographic location to the first geographic location of the user device used by the user to initiate the interaction, and
    a comparison of the one or more images with the identifier included in the second data of the authentication item obtained from the data store indicating the one or more images are of the authentication item; and in response to the authenticating of the camera device and the verifying that the user is in possession of the authentication item, approving the interaction and transmitting approval data, the approval data including the identifier for use in completing the interaction using the payment account.

\* \* \* \* \*